Sept. 10, 1963

H. E. McFADDEN ETAL 3,103,123

FLEXURE STRIP LINKAGE SYSTEM FOR AN
ELECTROMECHANICAL TRANSMITTER

Filed Jan. 26, 1962

United States Patent Office 3,103,123
Patented Sept. 10, 1963

3,103,123
FLEXURE STRIP LINKAGE SYSTEM FOR AN
ELECTROMECHANICAL TRANSMITTER
Harold E. McFadden, Willow Grove, Walton F. Staley, Jr., Philadelphia, and Edward Dawson, Ambler, Pa., assignors to Leeds and Northrup Company, Philadelphia, Pa., a corporation of Pennsylvania
Filed Jan. 26, 1962, Ser. No. 169,041
20 Claims. (Cl. 74—96)

This invention relates to a mechanical linkage for electrical measuring and control systems and particularly to a flexible linkage for transmitting motion from one element of a measuring instrument to another element thereof while maintaining a predetermined relationship between the movements of the elements. It is an object of the invention to provide a mechanical linkage system free of external friction and lost motion for converting the motion of an input element by a pressure-responsive device into substantially rectilinear motion of an element of an electromechanical transmitter which is directly proportional to a pressure or differential pressure while keeping to a minimum errors introduced by vibration, temperature change, and non-linear movement of the pressure-responsive device.

This invention is particularly adapted to position a magnet or probe in a magnetic-position sensor utilized in electromechanical transmitters, such for example as the type disclosed and claimed in Clark et al. Patent 2,957,115 or the copending patent application Serial No. 101,736, filed April 10, 1961, by Will McAdam, entitled "Null-Flux Transducer for Use in Electrical Measuring and Control Systems." Transmitters of the foregoing type are adapted to convert a process variable, such as pressure, into a proportional direct current. Where the measurement is derived from a bellows, or other type of rectilinear motion producing sensing element having a stroke of the proper magnitude as illustrated in FIG. 1 of the aforesaid Patent 2,957,115, the rectilinear motion of the probe within the slot of the stationary magnetic core may be produced directly without any intervening flexible linkage. However, many advantages are to be had by introducing a mechanical linkage between the condition sensing element and the probe, particularly when using a Bourdon tube and also when using other types of sensing elements so long as the mechanical linkage contributes substantially no "dead band" to the instrument response. Such a mechanical linkage of the present invention enables suitable positioning of the parts within the instrument. Another advantage of the present invention is that it minimizes the effects of vibration and/or unwanted effects due to dimensional changes of parts of the structure with change in ambient temperature in order that the electrical output of the transmitter will be directly representative of the condition being measured. A further advantage of the present invention is that it provides means to compensate for a non-linear relationship between rotation of a mechanical meter shaft, for example, and changes in condition measured by the meter.

In accordance with the present invention, there is provided a flexible linkage suitable for converting an input motion into a short substantially rectilinear output motion which is directly proportional to the signal which produces the input motion. Such flexible linkage utilizes flexure strips or flat springs as the pivots in the linkage. The flexure strips provide a substantially advantage over other types of pivots since the flexible strips have no external friction, are not subject to wear, require no lubrication and contribute little or no "dead band" to the instrument response. This is particularly important since the total output movement is quite small, normally being less than 0.100 inch, and thus any lost motion or external friction in the linkage would contribute substantially in introducing errors into the measurement.

In accordance with one aspect of the invention there is provided in an electromechanical transmitter, the improvement of a spring-linkage system free of external friction and lost motion for transmitting motion from one element of the transmitter to another while maintaining a predetermined relationship between the movements of the elements. The system includes an input element which moves as a function of a condition. There is also provided a pair of links interconnected at one of their ends by a spring flexure strip, the other end of one of the links being connected by way of a spring flexure strip to the input element. The other end of the other link is connected to a fixed support by way of a spring flexure strip and the output element is carried by one of the links.

More specifically, the present invention in one aspect thereof provides a mechanical linkage for a pressure transmitter including an element which moves as a function of pressure. A first link is connected at one end thereof to the element by a first flexure strip. A second link is connected at one end thereof to the other end of the first link by a second flexure strip, the opposite end of the second link being connected to a fixed support by a third flexure strip. A probe member is carried by the second link, the probe member having a portion disposed directly in line with the third flexure strip, such portion being movable in substantially a straight line within predetermined limits and directly proportional to the pressure which produces movement of the element. More specifically, the probe member is carried by a support member mounted on the second link. The probe has a longitudinal axis on a tangent to its motion about the third flexure strip with the aforesaid portion of the probe being located on a line perpendicular to its axis and passing through the center of pivotal axis of the third flexure strip. This portion of the probe is movable in a substantially straight line within predetermined limitations and directly proportional to the pressure.

In one aspect of the invention a pressure may be measured as by a Bourdon tube or a lever rotatably carried by the rotary output shaft of a Barton-differential pressure cell of the type shown in U.S. Patent 2,400,048, issued to Barton Jones May 7, 1946.

In the preferred form of the invention the flexure strips are made of heat-treated beryllium copper and the materials for the links are selected on the basis of their coefficient of thermal expansion to minimize motion of the probe as the result of ambient temperature changes.

For a more detailed disclosure of the invention and for further objects and advantages thereof, reference is to be had to the following description, taken in conjunction with the accompanying drawings in which.

Figure 1:
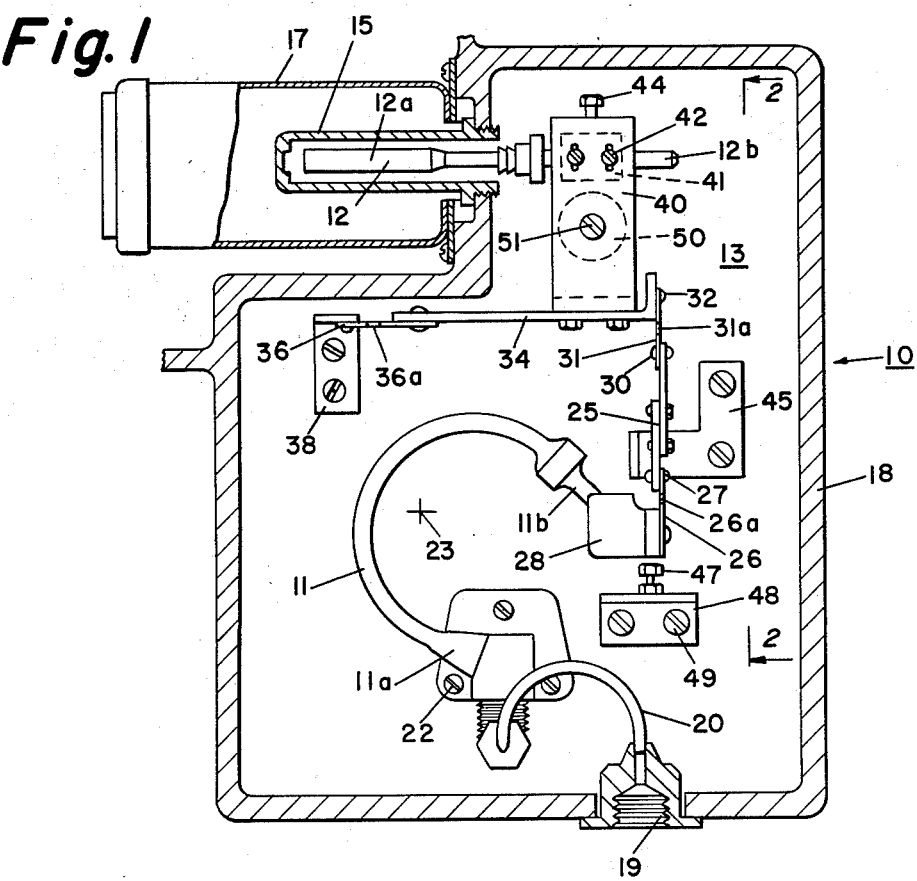
FIG. 1 is a sectional view of the case of a pressure transmitter showing a mechanical linkage embodying the present invention.

Referring to FIG. 1, the present invention has been illustrated in connection with a pressure transmitter 10 of the type employing a Bourdon tube 11 as the pressure sensing element. The Bourdon tube 11 is adapted to receive the fluid or gas whose pressure is to be measured and the free or closed end of the Bourdon tube is connected to a probe 12 by the novel mechanical linkage 13 so that the process pressure displaces the probe 12 a distance proportional to the pressure. The probe 12 has been illustrated in the form of a permanent magnet adapted for longitudinal movement within the well 15, the latter extending within the slot of a stationary magnetic core diagrammatically illustrated by housing 17. The probe 12 and associated magnetic core structure may be of the type illustrated in the aforesaid Clark et al. Patent 2,957,115 or in the aforesaid McAdam application Serial No. 101,736. It is further to be understood that the electrical circuits associated with the magnetic core structure likewise may be similar to any of the arrangements disclosed in the aforesaid patent and copending application.

As may be seen in FIG. 1, the Bourdon tube 11 and mechanical linkage 13 are positioned within a housing 18. The fluid or gas whose pressure is to be measured is piped into a pressure connection 19 at the bottom of housing 18 and through a tube 20 into the open end 11a of the Bourdon tube 11. The end 11a of the Bourdon tube is mounted in fixed position to the inner wall of the housing 18 as by screws 22. The Bourdon tube 11 comprises a piece of tubing, preferably a metal such as steel or brass, which is of non-circular cross section and is bent into the shape of a C. As the pressure from the controlled process increases, the pressure in the Bourdon tube 11 likewise increases and the tubing attempts to assume a round cross section. As the cross section becomes more round, the C-shape tends to straighten and the free or closed end 11b of the tube moves in an upward direction. It has been determined that the tube 11 acts like a lever with its pivot at the point indicated by the reference character 23.

The free end 11b of the Bourdon tube 11 is connected by a flexible connection to a vertical link 25. The flexible connection comprises a flexure strip 26 in the form of a strip of heat-treated beryllium copper or other suitable spring metal strip. The upper end of the flexure strip 26 is connected by suitable means, such as screws 27, to the lower end of vertical link 25 and the lower end of the flexure strip 26 is connected by a bracket 28 to the free end 11b of the Bourdon tube 11. The vertical link 25 may comprise a pair of members adjustable lengthwise of each other to permit adjustment of the overall length of the link 25. The upper end of the link 25 is secured, as by the screws 30, to the lower end of another flexure strip 31 similar to flexure strip 26. The upper end of the flexure strip 31 is likewise secured, as by screws 32, to one end of a horizontal link 34. The opposite end of the horizontal link is secured to one end of a flexure strip 36, the opposite end of which is secured to a fixed bracket 38. The bracket 38 is secured to the housing 18 and the flexure strip 36 is similar to the previously described flexure strips 26 and 31. As may be seen in FIG. 2, all of the flexure strips, as shown by flexure strips 26 and 31, are narrowed at their intermediate portions 26a, 31a, 36a better to control the flexible pivotal action between the rigid members of the mechanical linkage. The probe 12 is supported in a horizontal position by means of a bracket or vertical member 40, the lower end of which is secured to the end of the horizontal link 34 adjacent the flexure strip 31. A block 41 is secured to the upper end of the bracket 40 by screws 42 for supporting the probe axially of the well 15.

In describing the operation of the pressure transmitter, it will be assumed that there has been an increase in the process pressure. This increases the pressure within the Bourdon tube 11 causing the free end 11b of the Bourdon tube to move in an upward direction. This upward movement is transmitted through the flexure strip 26 and causes the vertical link 25 to move upwardly. Since the upper end of the vertical link 25 is connected by the flexure strip 31 to the free end of the horizontal link 34, the latter is caused to rotate in a counterclockwise direction about the horizontal flexure strip 36 which is secured to the housing 18 by the bracket 38. Since the probe or magnet 12 is connected rigidly to the horizontal link 34 by the vertical bracket 40, the probe 12 also moves in a counterclockwise direction about the intermediate portion 36a of the horizontal flexure strip 36. While the mounting end of the probe 12 moves at an angle of approximately 45° relative to the center line of the well 15, the portion 12a of the magnet or probe 12 which determines the output from the sensor 17 is located directly above the portion 36a of the horizontal flexure strip 36 and thus moves along the center line of the well 15.

It is of course to be understood that this substantially rectilinear movement of the portion 12a of the probe 12 takes place only within predetermined limits. For example, in pressure transmitters of the type disclosed in the aforesaid patent and patent application, Bourdon tubes of different type may be used providing a maximum travel which gives a probe motion of approximately 0.100" to a minimum Bourdon tube travel which gives a probe motion in the order of 0.030". Thus it will be seen that the amount of rectilinear movement required by such systems is very small.

Figure 2:
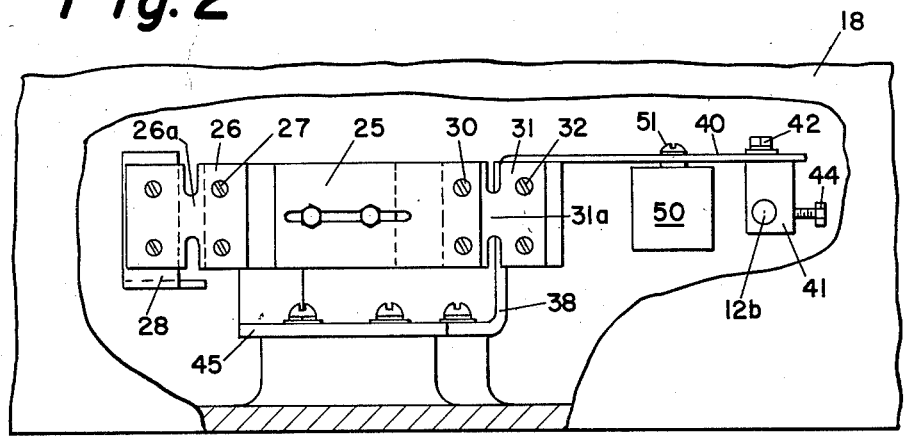
FIG. 2 is a fractional view, taken along the lines 2—2 in FIG. 1 and on enlarged scale.

As may be seen in FIGS. 1 and 2, the pressure transmitter 10 has been provided with a mechanical zero adjustment. This zero adjustment is accomplished by loosening the set screw 44 which clamps the shaft 12b of probe 12 to the linkage 13 and repositioning the probe. Such zero adjustment is required only during assembly of the pressure transmitter 10.

The materials for the links 25 and 34 are selected on the basis of their coefficient of thermal expansion to minimize motion of the probe 12 with respect to the sensor 17 with changes in ambient temperature. For example, when a steel Bourdon tube is used, and the housing 18 is made of aluminum, the tube 11 expands less than the aluminum casting when the ambient temperature increases. This causes the probe 12 to pull out of the well 15. To correct for this, the material in the horizontal link 34 is chosen so it also expands less than the casting 18, thus causing the probe 12 to enter the well 15 and compensate for the shift of the Bourdon tube 11. All of the other links are made of aluminum so as to match the coefficient of expansion of the casting or housing 18.

It is necessary that the flexure strips 26, 31 and 36 be made of a good spring material in order to keep the hysteresis of the linkage to a minimum. It has been found that this may be accomplished by the use of heat-treated beryllium copper.

In order to keep the Bourdon tube from taking a permanent set due to overpressure and similarly to protect the probe 12 from bottoming in the well 15 and thereby deforming the linkage 13, there is provided an overpressure stop 45 which is secured to the wall of the housing 18. The overpressure stop 45 is adapted to engage the bracket 28 connected to the free end 11b of the Bourdon tube 11 when a pressure in excess of the rated pressure of the transmitter is applied to the Bourdon tube 11.

By including a tube 20 between the pressure connection 19 and the Bourdon tube 11 any stresses from the external piping are kept from being transmitted to the Bourdon tube 11. If the piping were connected rigidly to the Bourdon tube 11 any motion of the external piping would cause the Bourdon tube 11 to move with respect to the housing 18 and give an error in position of the probe 12.

The pressure transmitter may include a zero suppressor. This is illustrated in FIG. 1 by the screw 47 which is carried by the bracket 48 secured to the housing 18 by screws 49. The screw 47 is adjusted to stop the Bourdon tube 11 before it returns to zero position.

To minimize vibration of the probe, the linkage 13 includes a dashpot 50 which is secured to the bracket 40 by a screw 51. The dashpot 50 consists of a cup partly filled with lead shot. During vibration, collisions of lead shot with the side of the cup and with one another dissipate energy and reduce the amplitude of vibration of the probe 12 so that the probe 12 never hits the end or sides of the well 15 and never goes beyond the linear range of the amplifier associated with the sensor. By this arrangement the probe 12 has equal amplitudes of vibration above and below its correct location and a recorder or controller connected to the transmitter sees the average position of the probe 12.

As previously pointed out, the flexure strips 26, 31 and 36 are identical and preferably are made from heat-treated beryllium copper. In a typical embodiment of the invention, the spring strips have a thickness of 0.008 inch, a width of 13/16 inch and a width of 3/8 inch at the narrowest portion where the pivotal axis is located. The effective length of the link 34 was 2 7/8 inches and the effective length of link 25 was about 2 3/8 inches. The distance between the theoretical pivot 23 of the Bourdon tube 11 and the portion 26a of the flexure strip was 3 1/4 inches. The Bourdon tube 11 when used to measure 0 to 100 p.s.i.g. had a range of input movement of 0.135 inch to 0.067 inch at the point of connection of the flexure strip 26, which produced an output movement of the probe 12 and particularly the portion 12a of 0.100 inch to 0.050 inch.

Figure 3:
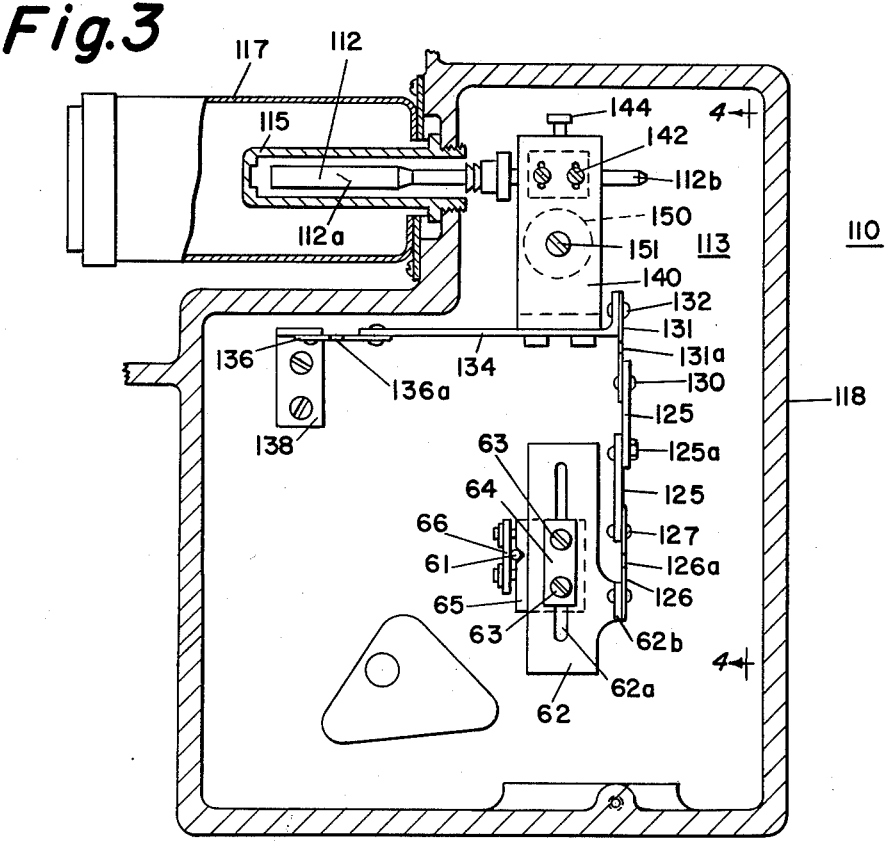
FIG. 3 is a modification of the invention illustrated in FIG. 1.
Figure 4:
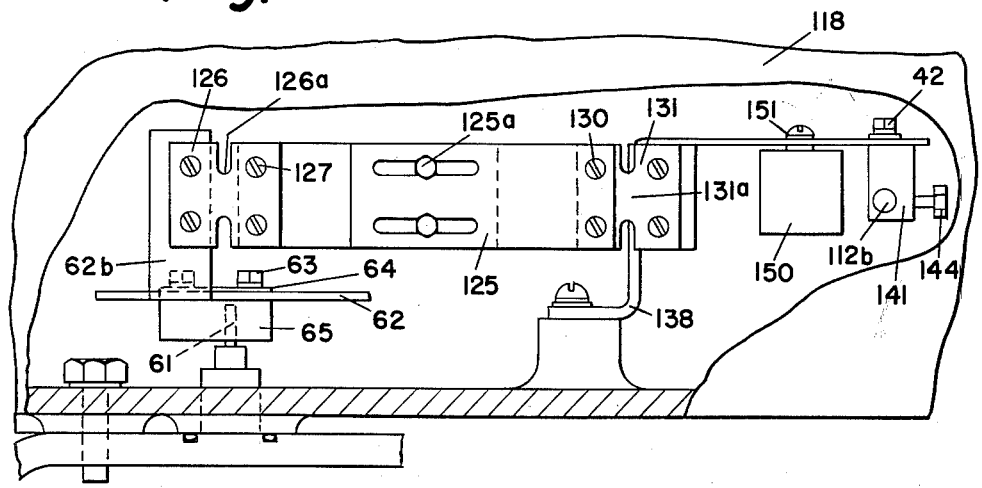
FIG. 4 is a fractional view taken along the lines 4—4 in FIG. 3 and on enlarged scale.

Referring to FIGS. 3 and 4, the novel spring-linkage system has been illustrated for use with a Barton differential pressure meter, such for example as the type disclosed in United States Letters Patent No. 2,400,048. A Barton differential pressure meter is adapted to convert differential pressure to a rotation of a torque tube shaft. Such a shaft is illustrated at 61 in FIGS. 3 and 4. In a Barton meter, high and low pressures are applied to a bellows arrangement to produce an output which is the differential pressure. The motion of the bellows moves a lever which rotates the torque tube shaft 61. The details of the Barton meter have not been illustrated here since they do not form part of the present invention and such details are well known in the art.

The differential pressure transmitter 110 of FIGS. 3 and 4 is very similar to the pressure transmitter 10 previously described and illustrated in connection with FIGS. 1 and 2. For purposes of clarity and ease of understanding, the parts in FIGS. 3 and 4 which correspond to those in FIGS. 1 and 2 have been identified by reference characters increased by 100. The torque shaft 61 is connnected to the probe 112 by the novel mechanical linkage 113 so that the differential pressure displaces the probe 112 a distance proportional to the differential pressure. The torque shaft 61 is connected to the flexible linkage 113 by a lever which includes a vertical bracket 62 having a slot 62a extending lengthwise thereof. The bracket 62 is connected to the shaft 61 by means of screws 63 which extend through a clamping plate 64 and through the slot 62a into a block 65 which is clamped to the shaft 61 by means of a clamping plate 66. Thus when shaft 61 rotates, the clamping block 65 likewise rotates and in turn imparts rotation to the vertical bracket 62. The bracket 62 includes a portion 62b which is connected as by screws to the lower end of the flexure strip 126, the upper end of which is connected as by screws 127 to the lower end of the vertical link 125. The vertical link 125 is made in two parts which are secured together with screws 125a to adjust the overall length of the link 125.

The purpose of the adjustments for the link 125 and the position of the lever 62 is for making the transmission ratio of the linkage variable by the amount necessary to compensate for a non-linear relationship between rotation of the meter shaft and changes in differential pressure. To make the transmission ratio of linkage 113 variable by the amount necessary the flexure strip 126 is moved up or down from its normal position. When the flexure strip 126 is moved down, equal angular increments of counterclockwise rotation of the shaft 61 cause steadily increasing increments of motion of the magnet or probe 112. Similarly, when the flexure strip 126 is moved up, equal angular increments of counterclockwise rotation of the shaft 61 produce steadily decreasing increments of motion of the probe 112. The remaining portions of the linkage 113 are identical with the linkage 13 previously described in detail and the actions of the two linkages are identical. For that reason, it is not believed necessary to repeat the description of the other corresponding parts in the linkage 113.

It will be seen from a comparison of FIGS. 3 and 4 with FIGS. 1 and 2 that the differential pressure transmitter 110 does not include provision for zero suppression or an overpressure stop since they are not needed. It does, however, include a dashpot for vibration damping.

Both of the arrangements illustrated include the new and improved all-spring pivot linkage system where flexure strips are used as the pivots and thus provide a substantially rugged linkage system in which the pivotal portions thereof are not affected by wear or external friction, do not require any lubrication, and contribute negligible dead band or lost motion to the instrument response.

It should be understood that the invention is not limited to the specific arrangements shown and that changes and modifications may be made within the scope of the appended claims.

What is claimed is:

1. A mechanical linkage for an electromechanical transmitter comprising an input element which moves as a function of a condition, a vertical link connected at its lower end to said element by a first flexure strip, a horizontal link connected at one end thereof to the upper end of said vertical link by a second flexure strip, the opposite end of said horizontal link being connected to a fixed support by a third flexure strip, a support member connected at its lower end to said one end of said horizontal link adjacent said second flexure strip, and a horizontal member carried by the upper end of said support member, said horizontal member having a portion disposed directly above said third flexure strip, said portion being movable in substantially a straight line within predetermined limits and directly proportional to the condition which produces movement of said input element.

2. A mechanical linkage according to claim 1 wherein said input element comprises a Bourdon tube.

3. A mechanical linkage according to claim 1 wherein said flexure strips consist of spring metal.

4. A mechanical linkage according to claim 3 wherein said spring metal strips are made of heat-treated beryllium copper.

5. A mechanical linkage according to claim 1 wherein said linkage is supported within a housing and the materials for said links are selected on the basis of their coefficient of thermal expansion to minimize motion of said horizontal member due to changes in ambient temperature.

6. A mechanical linkage according to claim 1 wherein said input element is a shaft the rotation of which is proportional to a differential pressure.

7. A mechanical linkage according to claim 6 wherein said linkage includes adjustment means for making the transmission ratio of said linkage variable by the amount necessary to compensate for a non-linear relationship between rotation of said shaft and changes in differential pressure.

8. An electromechanical transmitter including the improvement of a spring-linkage system free of external friction and lost motion for transmitting motion from one element of the transmitter to another while maintaining a desired relationship between the movements of said elements comprising an input element which moves as a function of a condition, a pair of links interconnected at one of their ends by a spring flexure strip, the other end of one of said links being connected by way of a spring flexure strip to said input element, and the other end of said other link being connected to a fixed support by way of a spring flexure strip, and an output element carried by one of said links.

9. An electromechanical transmitter according to claim 8 wherein said links are disposed at substantially right angles to each other.

10. An electromechanical transmitter according to claim 9 wherein said output element is carried by said link which is connected to said fixed support and includes a portion spaced to one side of said link and in line with said spring flexure strip which is connected to said fixed support.

11. A mechanical linkage for a pressure transmitter comprising an element which moves as a function of pressure, a first link connected at one end thereof to said element by a first flexure strip, a second link connected at one end thereof to the other end of said first link by a second flexure strip, the opposite end of said second link being connected to a fixed support by a third flexure strip, and a probe member carried by said second link, said probe member having a portion disposed directly in line with said third flexure strip, said portion being movable in substantially a straight line within predetermined limits and directly proportional to the pressure which produces movement of said element.

12. A mechanical linkage according to claim 11 wherein said links are substantially perpendicular to each other.

13. A mechanical linkage according to claim 11 including stop means for limiting the movement of said element.

14. A mechanical linkage for a pressure transmitter comprising a lever supported for rotation relative to a fixed pivotal axis and responsive to a pressure signal, said lever having a free end spaced from said pivotal axis, a first vertical link connected at its lower end to said free end of said lever by a first flexure strip, a horizontal link connected at one end thereof to the upper end of said first vertical link by a second flexure strip, the opposite end of said horizontal link being connected to a fixed support by a third flexure strip, a vertical portion of said horizontal link connected at its lower end to said one end of said horizontal link adjacent said second flexure strip, and a horizontal member carried by the upper end of said vertical portion, said horizontal member having a portion disposed directly above said third flexure strip, said portion being movable substantially rectilinearly within predetermined limits and directly proportional to the pressure signal which produces rotation of said lever.

15. A mechanical linkage for a pressure transmitter comprising an element which moves as a function of pressure, a vertical link connected at one end thereof to said element by means including a first flexure strip, a horizontal link connected at one end thereof to the other end of said vertical link by a second flexure strip, the opposite end of said horizontal link being connected to a fixed support by a third flexure strip, a vertical support member connected at one end thereof to said horizontal link, and a horizontal member carried by the other end of said vertical support member and substantially parallel to said horizontal link, said horizontal member having a portion disposed directly opposite said third flexure strip, said portion being movable in a substantially straight line within predetermined limits and directly proportional to the pressure signal which produces rotation of said element.

16. An electromechanical transmitter according to claim 8 where in two of said spring flexure strips are parallel to one of said links and the other said spring flexure strip is parallel to the other of said links.

17. An electromechanical transmitter according to claim 16 wherein one of said links is disposed vertically and the other of said links is disposed horizontally.

18. An electromechanical transmitter according to claim 8 wherein one of said links is adjustable to change the overall length thereof.

19. An electromechanical transmitter acording to claim 18 wherein said one element is a lever supported on a shaft the rotation of which is proportional to a differential pressure, and said lever includes adjustment means for making the transmission ratio of said linkage variable by the amount necessary to compensate for a non-linear relationship between rotation of said shaft and changes in differential pressure.

20. An electromechanical transmiter according to claim 9 wherein said output element is carried by said link which is connected to said fixed support, said output element having a longitudinal axis on a tangent to its motion about said spring flexure strip which is connected to said fixed support, and said output element having a portion thereof located on a line perpendicular to said axis and passing through the pivotal axis of said last-named flexure strip.

References Cited in the file of this patent
UNITED STATES PATENTS

| | | |
|---|---|---|
| 1,666,556 | Cravin | Apr. 17, 1928 |
| 2,307,248 | Vllman et al. | Jan. 5, 1943 |
| 2,536,198 | Matner et al. | Jan. 2, 1951 |
| 3,004,434 | Heise | Oct. 17, 1961 |

FOREIGN PATENTS

| | | |
|---|---|---|
| 958,923 | France | Dec. 30, 1947 |